US006795401B1

(12) United States Patent
Fukuoka

(10) Patent No.: US 6,795,401 B1
(45) Date of Patent: Sep. 21, 2004

(54) BAND WIDTH MEASURING METHOD AND APPARATUS FOR A PACKET SWITCHING NETWORK

(75) Inventor: Hiroyuki Fukuoka, Saitama (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/552,558

(22) Filed: Apr. 19, 2000

(30) Foreign Application Priority Data

Apr. 21, 1999 (JP) .......................................... 11-113369

(51) Int. Cl.$^7$ ......................... G01R 31/08; G06F 11/00; G08C 15/00; H04J 1/16; H04J 3/14
(52) U.S. Cl. ...................................... 370/236; 370/468
(58) Field of Search .................................. 370/253, 252, 370/249, 229, 230, 231, 230.1, 235, 236, 294, 241, 474, 396, 400, 410; 709/238; 379/21; 714/746, 748, 749, 468

(56) References Cited

U.S. PATENT DOCUMENTS

| | | | | |
|---|---|---|---|---|
| 5,477,531 A | * | 12/1995 | McKee et al. | 370/249 |
| 5,519,689 A | * | 5/1996 | Kim | 370/232 |
| 5,802,106 A | * | 9/1998 | Packer | 375/225 |
| 6,002,671 A | * | 12/1999 | Kahkoska et al. | 370/248 |
| 6,363,056 B1 | * | 3/2002 | Beigi et al. | 370/252 |
| 6,424,624 B1 | * | 7/2002 | Galand et al. | 370/231 |

FOREIGN PATENT DOCUMENTS

EP          0 522 211       1/1993

OTHER PUBLICATIONS

Lai, K. et al.; "Measuring Bandwidth"; Proceeding IEEE Inforcom. The Conference on Computer Communications, US, New York; Mar. 21, 1999; pp. 235–245.
Vern Paxson; "Measurements and Analysis of End–to–End Internet Dynamics"; PhD Dissertation; Apr. 1997.
Srinivasan Deshav; "A Control–Theoretic Approach to Flow Control"; Computer Communications Review; US; Association for computing Machinery, vol. 21, No. 4, Sep. 1, 1991.
Kevin Lai and Mary Baker, 1999 IEEE, Department of Computer Science, Stanford University—"Measuring Bandwidth", p. 235–245.

* cited by examiner

Primary Examiner—Ajit Patel
Assistant Examiner—Yvonne Quy Ha
(74) Attorney, Agent, or Firm—Westerman, Hattori, Daniels & Adrian, LLP

(57) ABSTRACT

A bandwidth measuring method for a packet switching network in which a bandwidth of a packet switching network includes a plurality of nodes for packet switching connected mutually is measured, the method includes a procedure in which a plurality of test packets which at least include two test packets having different packet length are fed to the packet switching network so that in the two test packets, the test packet having a long packet length and the test packet having a short packet length are successive in this order, and a procedure in which a receiver receiving each test packet determines an immediately former bandwidth based on the difference in the reception completion timing thereof.

2 Claims, 4 Drawing Sheets

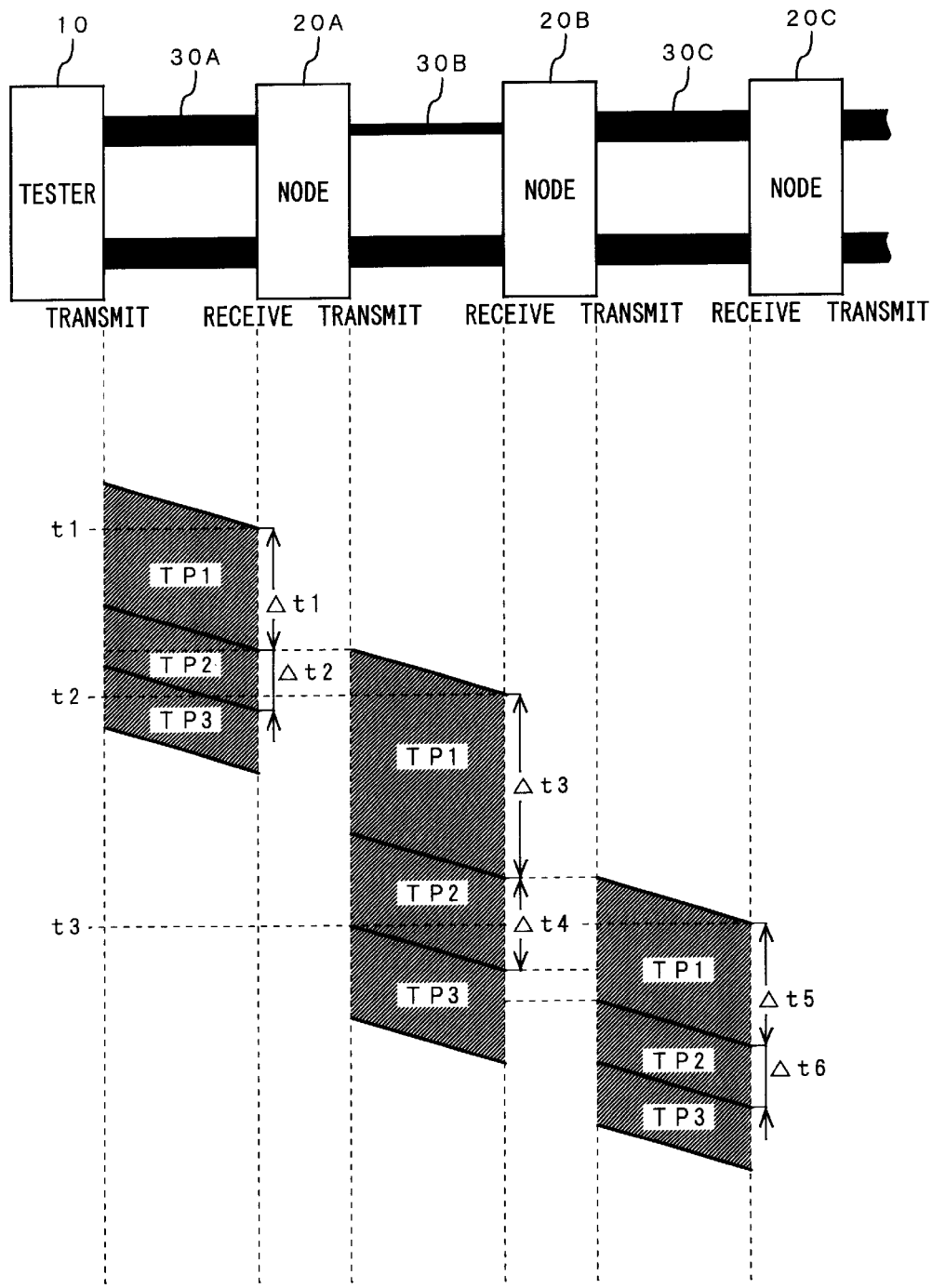

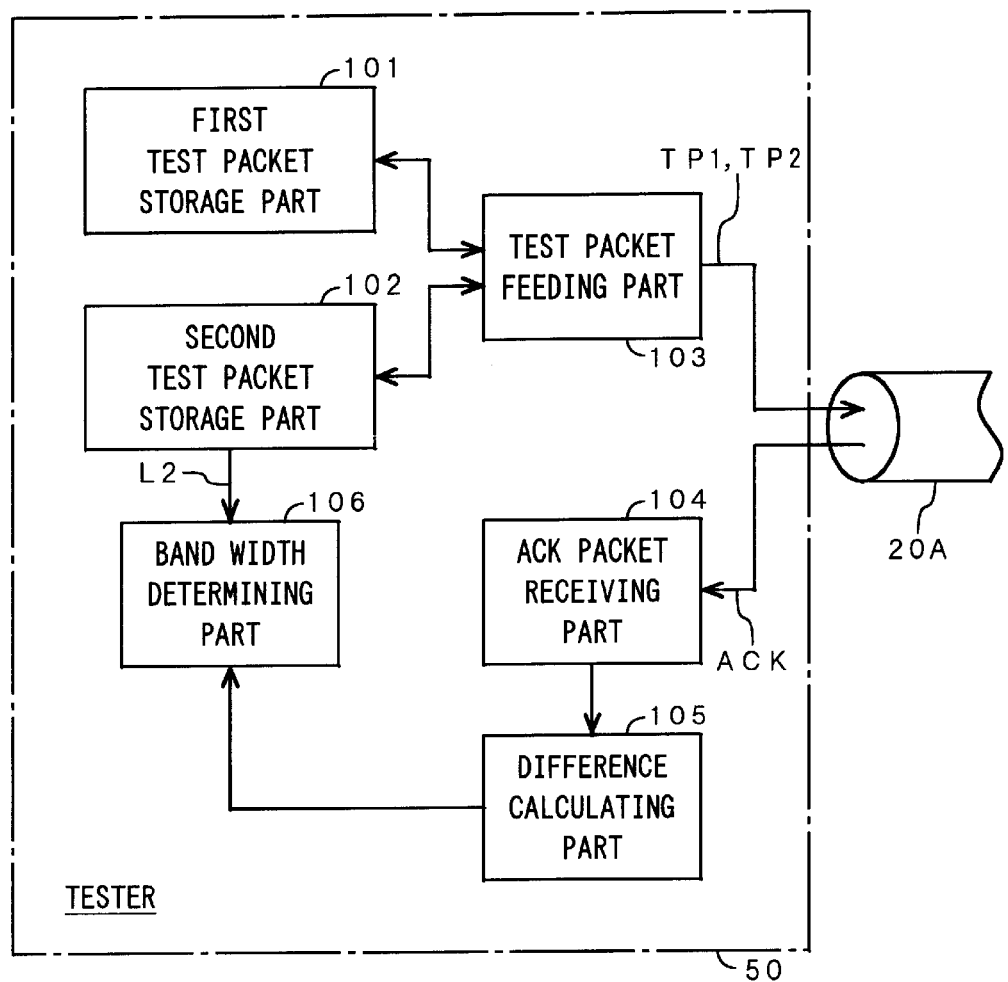

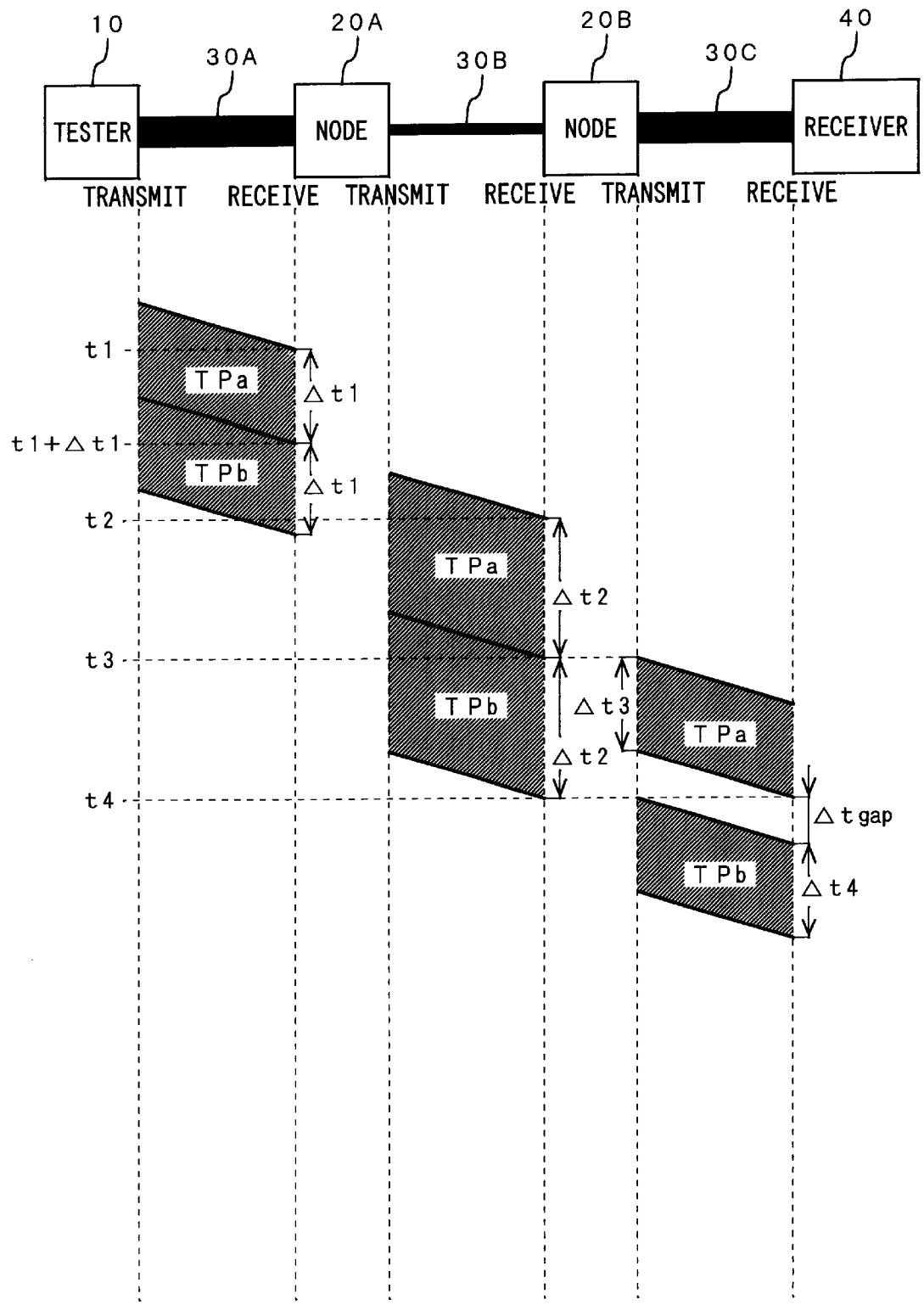

BAND WIDTH MEASURING METHOD AND APPARATUS FOR A PACKET SWITCHING NETWORK

BACKGROUND OF THE INVENTION

1. Field of the Invention

The present invention relates to a bandwidth measuring method and apparatus for a packet switching network in which a plurality of test packets are fed to a packet switching network so that the bandwidth is measured, and more specifically relates to a bandwidth measuring method and apparatus for a packet switching network in which even a bandwidth (capacity) of a link that is distant from a tester that transmits test packets can be measured.

2. Description of the Related Art

FIG. 4 is a diagram showing a conventional bandwidth measuring method for a packet switching network. A receiver 40 is connected to a tester 10 via two transit nodes 20A, 20B.

In FIG. 4, the line width of each link 30A, 30B, 30C connecting among the tester 10, each transit nodes 20A, 20B and the receiver 40 represent the bandwidth of each one, respectively, and here, the bandwidth of the link 30B between the transit nodes 20A, 20B is narrower than those of other links 30A, 30C, thereby forming a so-called bottleneck.

A tester 10 as a bandwidth measuring apparatus feeds two (or more) test packets TPa, TPb, which have the same packet length L to a link 30A. When receiving each test packet, a transit node 20A transfers one after another each test packet TPa, TPb to a link 30B of its latter part, each time a reception is completed. The transit node 20A starts receiving the test packet TPa at the time t1, and competes the reception at the time (t1+Δt1) that is Δt1 after t1. Receiving the test packet TPb starts immediately after the completion of the reception of the test packet TPa, and the transit node 20A completes the reception at the time (t1+2·Δt1) that is Δt1 after the completion of the reception of the test packet TPa.

When the transit node 20A is a receiver, the difference (=Δt1) between the reception completion time of the test packet TPb (t1+2·Δt1) and the reception completion time of the test packet TPa (t1+Δt1) is calculated. This difference Δt1 corresponds to a transfer time of the test packet TPb by the link 30A as far as the reception completion timing of the test packet TPa at the transit node 20A (receiver) and the reception starting timing of the test packet TPb correspond to each other. The bandwidth of the link 30A can be determined at the transit node 20A (receiver) based on the difference Δt1 and the packet length L of the test packet TPb.

In FIG. 4, a transit node 20B receives the test packet TPa via the link 30B at the time t2, and when the transit node 20B completes the reception Δt2 after, it immediately transfers the test packet TPa received to a link 30C. Similarly, the transit node 20B completes the reception of the test packet TPb at the time (t2+2·Δt2) and immediately transfers it to the link 30C. Since the bandwidth of the link 30B is narrower than that of the link 20A, the period Δt2 that the transit node 20B requires to receive each test packet TPa, TPb becomes longer than the Δt1.

If the bandwidth of the link 30C that is the latter part is sufficiently wide as similar to the link 30A, as the transit node 20B starts transferring the test packet TPa at the time t3, the transfer can be completed after Δt3 (<Δt2) that is similar to the Δt1. However, since Δt3 is shorter than the Δt2, at the transit node 20B at the time (t3+Δt3), when the transfer of the TPa is completed, the reception of the test packet TPb is not completed. Thus, the transit node 20B cannot start transferring the test packet TPb immediately after the transferring of the test packet TPa is completed.

The transit node 20B, immediately after completing the reception of the test packet TPb at the time (t2+2·Δt2), transfers it to a receiver 40. However, after the completion of the reception of the first test packet TPa at the time t4, an empty time (between packets gap) Δt gap is generated at the receiver 40 until the reception of the next test packet TPb is started. When the reception of the test packet TPb is completed Δt4 after the start of the reception, the times when the receiver 40 completes the receptions of each test packet TPa, TPb become t4, (t4+Δt gap+Δt4), respectively. Since the difference (Δt gap+Δt4) extra includes the between packets gap Δt gap, a true transmitting time of the test packet TPb is not represented. Therefore, the receiver 40 cannot determine the bandwidth of the link 30C based on the difference (Δt gap+Δt4) and the packet length L of the test packet TPb.

SUMMARY OF THE INVENTION

The object of the present invention is to provide a bandwidth measuring method and apparatus for a packet switching network in which a bandwidth of a link that is distant from a tester that transmits test packets, specifically a bandwidth distant beyond a bottleneck, can be measured.

A feature of the present invention is to that, a bandwidth measuring method for a packet switching network in which a bandwidth of a packet switching network comprising a plurality of nodes for packet switching connected mutually is measured, said method comprising a procedure in which a plurality of test packets which at least include two test packets having different packet length are fed to the packet switching network so that in said two test packet, the test packet having a long packet length and the test packet having a short packet length are successive in this order, and a procedure in which a receiver receiving each test packet determines an immediately former bandwidth based on the difference in the reception completion timing thereof.

According to the aforementioned characteristics, in two test packets that were successively fed, since the packet length (L1) of the first test packet (TPI) is longer than the packet length (L2) of the next test packet (TP2). Therefore, the transit node to whose latter part a target link is connected can complete the receiving of the next test packet (TP2) from the link of the former part until feeding of the first received test packet (TP1) to the target link is completed, even when the bandwidth of the link that is connected to the former part of the transit node is narrower than that of the target link.

Therefore, to the target link of the latter part, the next test packet (TP2) can be fed at the same time when feeding of the first test packet (TP1) is completed, thereby enabling prevention of generation of a between packets gap of each test packet on the target link of the latter part. As a result of this, since the difference of the times when the receiver of the latter part completes receiving of each test packet represents the times that the target link requires to transfer the test packet (TP2), the receiver can determine the bandwidth of the target link based on the difference of the receiving completion times and the packet length of the test packet (TP2).

BRIEF DESCRIPTION OF THE DRAWINGS

FIG. 2 is a diagram showing a bandwidth measuring method for a packet switching network of the second embodiment according to the present invention.

FIG. 3 is a functional block diagram showing a packet switching tester of the third embodiment according to the invention.

FIG. 4 is a diagram showing a conventional bandwidth measuring method for a packet switching network.

DETAILED DESCRIPTION OF THE PREFERRED EMBODIMENT

Figure 1:
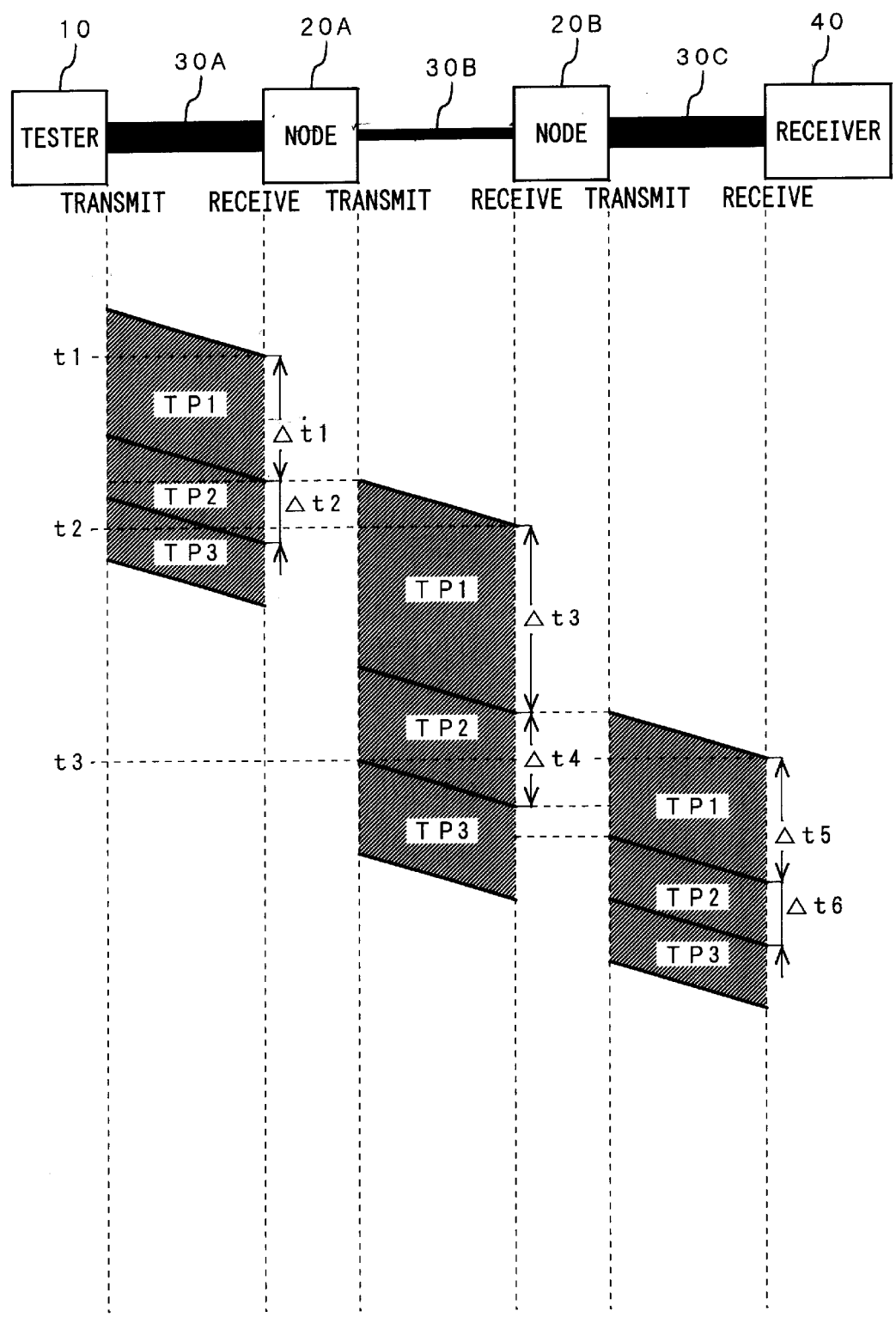
FIG. 1 is a diagram showing the first embodiment of a bandwidth measuring method for a packet switching network according to the present invention.

FIG. 1 is a diagram showing the first embodiment of a packet switching network bandwidth measuring method according to the present invention. A receiver 40 is connected to a tester 10 via two transit nodes 20A, 20B.

In FIG. 1, the line widths of each link 30A, 30B, 30C connecting among the tester 10, each transit node 20A, 20B and the receiver 40 represent the bandwidth of each one, respectively, and here, the bandwidth of the link 30B between the transit nodes 20A, 20B is narrower than those of other links 30A, 30C, thereby forming a so-called bottleneck.

The tester 10 feeds a plurality (in the present embodiment, three) of test packets TP1, TP2, TP3, which include at least two test packets TP1, TP2, whose packet lengths are different, to the link 30A. The packet lengths L1, L2 of each test packet TP1, TP2 have a relationship of L1>L2, and concrete conditions of each packet length L1, L2 will be described later.

The transit node 20A starts receiving the test packet TP1 at the time t1, and when completing the reception at the time (t1+Δt1) after Δt1, transfers this test packet TP1 to the link 30B. Regarding the test packet TP2, after the completion of the reception of the test packet TP1, the transit node 20A completes the reception after Δt2 that is shorter than the Δt1, that is at the time (t1+Δt1+Δt2) and transfers this test packet TP2 to the link 30B.

After each transit node completes receiving test packets, until they start to transfer these to the link of the latter part, a little response delay is generated. However, here, explanation will be made while ignoring the response delay.

The transit node 20B receives the test packet TP1 via the link 30B at the time t2, and when completing the reception after Δt3, immediately transfers the received test packet TP1 to the link 30C. The transit node 20B transfers the test packet TP2 to the link 30C immediately after completing the reception of it at the time (t2+Δt3+Δ4). Since the bandwidth of the link 30B is narrower than that of the link 20A, the periods Δt3, Δt4 which the transit node 20B requires to receive each test packet TP1, TP2 become longer compared with each of the Δt1, Δt2.

Since the bandwidth of the link 30C of the latter part is fully wide similar to the link 30A, when receiving the test packet TP1 at the time t3, the receiver 40 completes the reception after Δt5 (<Δt3) that is similar to the Δt1. In the present embodiment, since the packet length L1 of the test packet TP1 is longer than the packet length L2 of the test packet TP2, at the transit node 20B the reception from the link 30B of the test packet TP2 can be completed before the time when the transfer to the link 30C of the test packet TP1 is completed. Thus, at the transit node 20B, immediately after the completion of transferring of the test packet TP1, feeding of the test packet TP2 can be started, whereby a between packets gap is not generated on the link 30C. As a result, also at the receiver 40 each test packet TP1, TP2 can be received successively without a break.

Although the receiver 40 can complete the reception of each test packet TP1, TP2 at the times (t3+Δt5), (t3+Δt5+Δt6), since the between packets gap is not generated on the link 30C, the difference (=Δt6) represents a transmitting time of the test packet TP2 on the link 30C. Accordingly, at the receiver 40 the bandwidth of the link 30C can be determined based on the difference Δt6 and the packet length L2 of the test packet TP2.

The relationship between the capacities of each link 30 and the packet lengths L1, L2 of each test packet TP1, TP2 will be explained. In FIG. 1, if the link 30C is made a target link, it is necessary to make the between packets gap between each test packet TP1, TP2 on the link 30C substantially "0".

The between packets gap G (i) between each test packet TP1, TP2 on the link 30C is given by the following expression, provided that the between packets gap between each test packet TP1, TP2 on the link 30B is G (i−1), the bandwidth of the link 30B is X (i−1), and the bandwidth of the link 30C is X (i).

$$G(i) = \max\left\{G(i-1) + \frac{L2}{X(i-1)} - \frac{L1}{X(i)}, 0\right\}$$

Here, max {m, n} is a function that adopts either greater variable of variables m, n. A condition for the between packets gap G (i) of the link 30C to be "0" is given by the following expression.

$$G(i-1) + \frac{L2}{X(i-1)} - \frac{L1}{X(i)} \leq 0$$

The following expression is given by changing the above described expression.

$$L1 \geq X(i)\left\{\frac{L2}{X(i-1)} + G(i-1)\right\}$$

If let the link 30B is the first bottleneck, since the between packets gap G (i−1) can be expected to be "0", the following expression is obtained.

$$L1 \geq \frac{X(i)}{X(i-1)}L2$$

Thus, for example, it can be expected that the bandwidth (transmission speed) of the link 30C is approximately 128 kbps and the bandwidth of the link 30B is approximately 64 kbps, and if the packet length L2 of the test packet TP2 is 100 bytes, it is necessary to set the packet length L1 of the test packet TP1 to 200 bytes or more.

According to the present embodiment, since the packet lengths of a plurality of test packets fed to a packet switching network including a target link are positively made different and the packet length L1 of the test packet TP1 that is fed first is made longer than the packet length L2 of the test packet TP2 that is fed next, even when there is a difference between bandwidth of each link, the generation of the between packets gap of each test packet can be substantially prevented. Thus, even a bandwidth beyond a bottleneck can be correctly determined based on reception completion times of each test packet and packet lengths of test packets.

FIG. 2 is a diagram showing a packet switching network bandwidth measuring method of the second embodiment according to the present invention. Three transit nodes 20A–20C are connected mutually.

In FIG. 2, the line widths of each link 30A, 30B, 30C connecting among the tester 50, each transit node 20A, 20B and 20C represent the bandwidth of each one, respectively, and here, the bandwidth of the link 30B between the transit nodes 20A, 20B is narrower than those of other links 30A, 30C, thereby forming a so-called bottleneck.

The tester 50 feeds a plurality (in the present embodiment, three) of test packets TP1, TP2, TP3, which include at least two test packets TP1, TP2, whose packet lengths are different, to the link 30A. The packet lengths L1, L2 of each test packet TP1, TP2 have a relationship of L1>L2, and concrete conditions of each packet length L1, L2 will be described later.

When receiving each test packet, if it is not for itself as a terminal, the transit node 20A transfers one after another each test packet to the link 30B, each time a reception is completed, and if it is for itself as a terminal, the transit node 20A returns for each test packet an ACK packet in which the reception completion times are registered, to a tester 50 that is a transmitting source.

The transit node 20A starts receiving the test packet TP1 at the time t1, and when completing the reception after $\Delta t1$, registers a reception completion time (t1+$\Delta t1$) in the ACK packet and returns it to the tester 50. Regarding the test packet TP2, since the reception is completed after $\Delta t2$ that is shorter than the $\Delta t1$, the ACK packet in which a reception completion time (t1+$\Delta t1$+$\Delta t2$) is registered is separately returned.

The tester 50 receiving each ACK packet calculates the difference (=$\Delta t2$) between the reception completion time (t1+$\Delta t1$+$\Delta t2$) registered in the ACK packet responding to the test packet TP2 and the reception completion time (t1+$\Delta t1$) registered in the ACK packet responding to the test packet TP1 and determines the bandwidth of the link 30A based on this difference and the packet length L2 of the test packet TP2.

If the test packet is not for the transit node 20A, the transit node 20B receives the test packet TP1 via the link 30B at the time t2 and completes the reception after $\Delta t3$. The transit node 20B, if this test packet TP1 is not for itself as a terminal, immediately transfers this to the link 30C.

The transit node 20B transfers the test packet TP2 to the link 30C immediately after completing the reception of it at the time (t2+$\Delta t3$+$\Delta 4$). Since the bandwidth of the link 30B is narrower than that of the link 20A, the periods $\Delta t3$, $\Delta t4$ which the transit node 20B requires to receive each test packet TP1, TP2 become longer compared with each of the $\Delta t1$, $\Delta t2$.

Since the bandwidth of the link 30C of the latter part is fully wide similar to the link 30A, when receiving the test packet TP1 at the time t3, the transit node 20C completes the reception after $\Delta t5$ (<$\Delta t3$) that is similar to the $\Delta t1$. In the present embodiment, since the packet length L1 of the test packet TP1 is longer than the packet length L2 of the test packet TP2, at the transit node 20B the reception from the link 30B of the test packet TP2 can be completed at the time when the transfer to the link 30C of the test packet TP1 is completed. Thus, at the transit node 20B, immediately after the completion of transferring of the test packet TP1, feeding of the test packet TP2 can be started, whereby a between packets gap is not generated on the link 30C. As a result, also at the transit node 20C each test packet TP1, TP2 can be received successively without a break.

The times that the transit node 20C registers in the ACK packet at the reception completion times of each test packet TP1, TP2, respectively, correspond to (t3+$\Delta t5$), (t3+$\Delta t5$+$\Delta t6$), and the difference (=$\Delta t6$) represents a transmitting time of the test packet TP2 on the link 30C. Thus, at the tester 50, based on the difference $\Delta t6$ and the packet length L2 of the test packet TP2, the bandwidth of the link 30C can be determined.

FIG. 3 is a functional block diagram of the tester 50. A test packet TP1 is stored in a first test packet storage part 101. The test packet TP2 is stored at a second test packet storage part 102. The test packet feeding part 103 reads out each test packet from each test packet storage part 101, 102 and successively feeds them to the link 20A in order of packet length as the test packet TP1 that has a long packet length is first.

An ACK packet receiving part 104 receives the ACK packet that is returned from a packet switching network responding to each test packet. A difference calculating part 105 calculates the difference in the reception completion timing of each test packet that is registered in each ACK packet corresponding to each test packet. A bandwidth determining part 106 determines the bandwidth of a link based on the data regarding the aforementioned difference and the packet length L2 of the test packet TP2.

According to the present embodiment, since the packet lengths of a plurality of test packets fed to a packet switching network including a target link are positively made different and the packet length L1 of the test packet TP1 that is fed first is made longer than the packet length L2 of the test packet TP2 that is fed next, even when there is a difference between bandwidth of each link, the generation of the between packets gap of each test packet can be substantially prevented.

At the tester 50, as well as regarding a link beyond a bottleneck, the bandwidth can be correctly determined based on the reception completion times of each test packet registered in the ACK packet corresponding to each test packet and a packet length of the test packet.

According to the present invention, by positively changing packet lengths of test packets that are successively fed to a packet switching network as a measure target, even when there is a difference between capacities of each link, it is substantially possible to prevent a generation of a between packet gap of each test packet. Thus, even a bandwidth beyond a bottleneck can be correctly determined based on reception completion times of each test packet and packet lengths of test packets.

What is claimed is:

1. A bandwidth measuring method for a packet switching network in which a bandwidth of a packet switching network comprising a plurality of transit nodes for packet switching connected mutually is measured, said method comprising:

a procedure in which a plurality of test packets which at least include two test packets having different packet lengths are fed to the packet switching network so that in said two test packets, the test packet having a long packet length and the test packet having a short packet length are successive in this order;

a procedure in which each packet switching apparatus receiving said each test packet returns each acknowledge (ACK) packet that registers a reception completion timing thereof; and a procedure in which a packet switching device receiving said acknowledge packet determines a bandwidth of the link based on the difference in the reception completion timing that is registered in said each acknowledge confirmation packet received, wherein each packet length of said two test packets having different packet lengths satisfies the following conditional expression, provided that the bandwidth of a target link is B(i), the bandwidth of a link of the former part of said target link is B(i−1), the packet length of the test packet having a long packet length is L1, and the packet length of the test packet having a short packet length is L2, $$L1/L2 > B(i)/B(i-1).$$

2. A bandwidth measuring method for a packet switching network in which a bandwidth of a packet switching network comprising a plurality of transit nodes for packet switching connected mutually is measured, said method comprising:

a procedure in which a plurality of test packets which at least include two test packets having different packet lengths are fed to the packet switching network so that in said two test packets, the test packet having a long packet length and the test packet having a short packet length are successive in this order; and a procedure in which a receiver receiving each test packet determines an immediately former bandwidth based on the difference in the reception completion timing thereof, wherein each packet length of said two test packets having different packets lengths satisfies the following conditional expression, provided that the bandwith of a target link is B(i), the bandwidth of a link of the former part of said target link is B(i−1), the packet length of the test packet having a long packet length is L1, and the packet length of the test packet having a short packet length is L2, $$L1/L2 > B(i)/B(i-1).$$

* * * * *